June 17, 1969  S. G. POTRZUSKI  3,450,458
FIELD SPECIMEN MICROSCOPE

Filed May 27, 1966  Sheet 1 of 2

INVENTOR.
STANLEY G. POTRZUSKI
BY
Walter G. Finch
ATTORNEY

June 17, 1969  S. G. POTRZUSKI  3,450,458
FIELD SPECIMEN MICROSCOPE
Filed May 27, 1966

INVENTOR.
STANLEY G. POTRZUSKI
BY
Walter G. Finch
ATTORNEY

United States Patent Office 3,450,458
Patented June 17, 1969

3,450,458
FIELD SPECIMEN MICROSCOPE
Stanley G. Potrzuski, 452 Elrino St.,
Baltimore, Md. 21224
Filed May 27, 1966, Ser. No. 553,521
Int. Cl. G02b 21/26
U.S. Cl. 350—86                                                1 Claim

ABSTRACT OF THE DISCLOSURE

A holder-viewer for positioning and examining specimens under a lens in the field, comprising a cup-like translucent body with a translucent conical cap in which a magnifier lens is secured and a recessed stage or tray for retention in the bottom of the body.

---

This invention relates generally to microscopes, and more particularly it pertains to a receptacle with a specimen and magnifying glass support.

Nature observation field trips can be made more interesting with the aid of on-the-spot microscope examinations of specimens. Unfortunately, heretofor there has been no field device of this type suited for young or old people having little mechanical skill or poor coordination.

Accordingly, it is an object of this invention to provide a field specimen microscope which depends from the neck of the user for ready and simple use even while walking or under windy conditions.

Another object of this invention is to provide a novel specimen stage especially for a field microscope which is nonspilling and self-centering.

Yet another object of the invention is to provide a shielded specimen receptacle for a microscope with means for quickly alternating from inorganic to biological specimen viewing.

Still another object of this invention is to provide a field microscope which converts to a field telescope.

Other objects and attendant advantages of this invention will become more readily apparent and understood from the following detailed specification and accompanying drawings in which.

Figure 1:
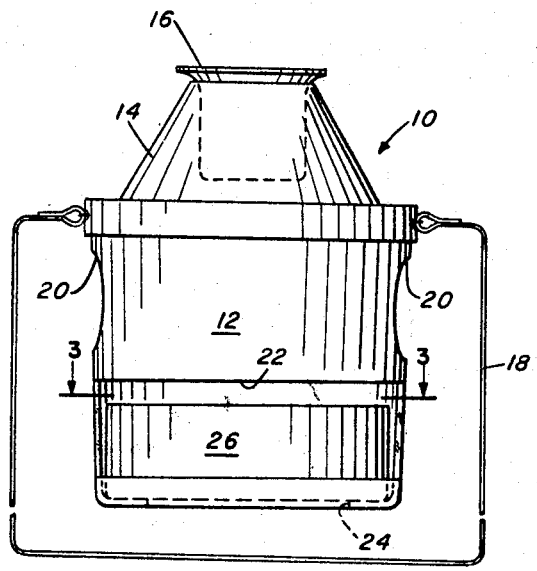
FIG. 1 is a side elevation of a field microscope embodying features of this invention.
Figure 2:
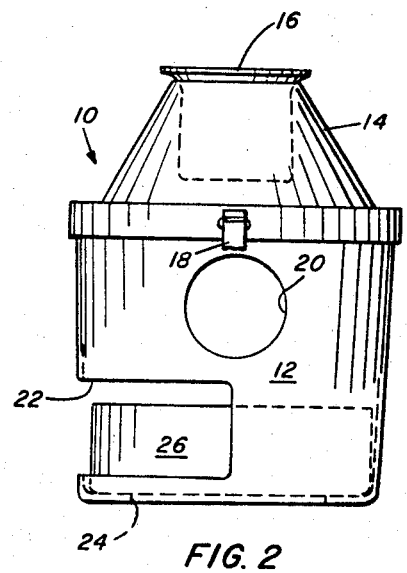
FIG. 2 is a side elevation taken at right angles to FIG. 1.

Referring now to the details of the invention as shown in FIGS. 1 and 2, reference numeral 10 indicates generally a nature study field microscope incorporating features of this invention.

The microscope 10 consists of a cup-like body 12 of translucent plastic having a tight fitting conical cap 14 of the same material. The cap 14 is truncated to tightly accommodate an eyepiece magnifier 16, such as a jeweler's loupe.

A leather strap or fabric ribbon 18 is secured at its ends on opposite sides of the cap 14 and of such length as to be placed around the neck of the user and depend upon his chest at a position convenient for viewing by bending his head and applying his eye to the eyepiece 16.

A pair of diametrically opposite apertures 20 are located in the sides of the body 12 and therebelow a large slot 22 is provided in the wall so as to leave a shallow cup-like seat in the bottom. Additionally, a large aperture 24 is cut out of the bottom of the body 12. The slot 22 extends approximately half way around the body 12 and forms a doorway through which a specimen tray 26 can be inserted.

Figure 3:
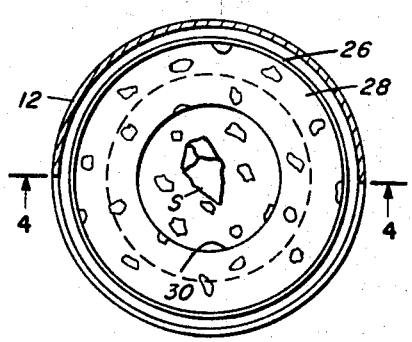
FIG. 3 is a cross section taken on line 3—3 and viewed in the direction of the arrows of FIG. 1.
Figure 4:
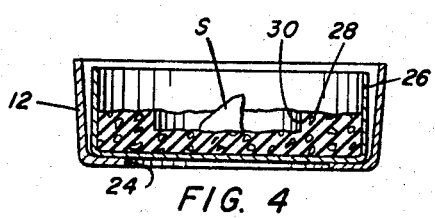
FIG. 4 is a vertical section taken on line 4—4 of FIG.3.

This tray 26, as best shown in FIGS. 3 and 4, is a shallow cup of plastic inside the bottom of which is cemented a layer of sponge rubber 28 having a torn scabrous top surface. Additionally, a central diameter of the rubber layer is recessed somewhat as indicated by reference 30 and has the same rough finish therein.

In use, the tray 26 is inserted in the body 12 through the doorway or slot 22 and drops down to be retained in position from accidental dislodgement. Additionally, the side of the tray 26 almost completely closes the slot 22 so as to effectively complete a windshield for any specimens S inserted through the apertures 20 to drop onto the sponge rubber 28. Small specimens S can easily be shaken into the centering recess 30 at a good viewing position for the eyepiece magnifier 16. It will be noted the rough surface of the rubber 28 supports the specimen in any attitude desired.

Figure 6:
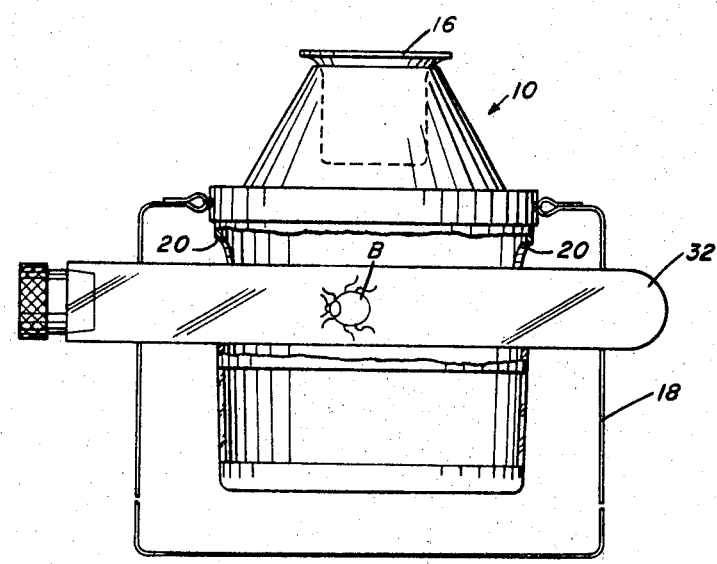
FIG. 6 is a view similar to FIG. 1 showing the biological specimen holder in position.

For viewing insects B or other biological specimens which might crawl or fly from the field of view a stoppered glass test tube specimen holder 32 is provided for insertion transversely through the body 12 through apertures 20 as shown in FIG. 6.

Figure 5:
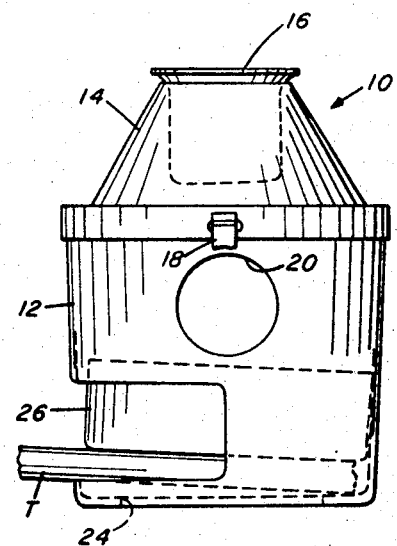
FIG. 5 is a view similar to FIG. 2 showing the manipulation of the specimen tray.

The tray 26 is easily manipulated by the fingers of the user through the slot 22 or the bottom aperture 24. Additionally, a twig T may be inserted through the slot 22 to tilt the tray 26 as shown in FIG. 5 for obtaining oblique views of the specimens therein.

Figure 7:
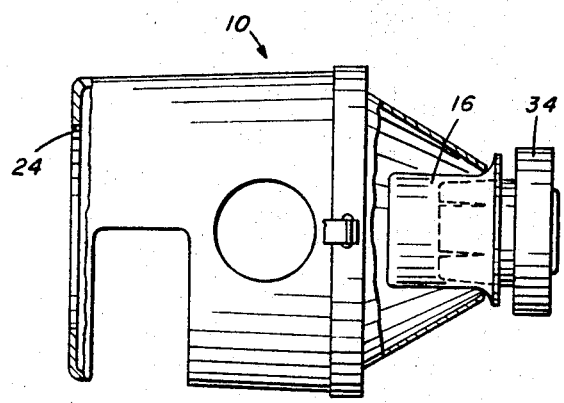
FIG. 7 depicts the conversion of the field microscope to a field telescope or bird glass.

When the tray 26 and test tube 32 specimen holders are removed from the body 12 and a stopper-like second eyepiece lens 34 is inserted in the loupe or magnifier 16 as shown in FIG. 7, this device 10 becomes a field telescope for bird watching, etc. with a hood formed by the hands of the user about body 12.

Obviously many modifications and variations of the present invention are possible in light of the above teachings. It is, therefore, to be understood that within the scope of the appended claim the invention may be practiced otherwise than as specifically described.

What is claimed is:

1. A field specimen microscope comprising test tube and circular-tray removable stage means for holding a specimen, a translucent tubular housing having at least one transverse opening for receiving said circular-tray stage means for rotatable support within said housing and diametrically opposed openings for supporting said test tube stage means protrusively therethrough said housing having a translucent conical cap, magnifying means extending axially through said cap into said housing for viewing said specimen on either of said stage means under magnification, a lens adapted for insertive attachment to said magnifying means whereby on removal of said stage means the microscope is converted to a telescope, and means for supporting said housing.

References Cited

UNITED STATES PATENTS

| | | | |
|---|---|---|---|
| 3,121,961 | 2/1964 | Engle et al. | 350—86 XR |
| 737,844 | 9/1903 | Hubbard | 350—38 |
| 971,798 | 10/1910 | Somdal | 350—249 |
| 1,002,910 | 9/1911 | Foote. | |
| 2,486,026 | 10/1949 | Hills | 350—91 X |
| 2,552,940 | 5/1951 | Cornut | 350—39 |
| 3,088,367 | 5/1963 | Haupt et al. | 350—72 |
| 3,112,570 | 12/1963 | Vasconcellos | 350—18 XR |
| 3,171,883 | 3/1965 | Jones | 350—91 XR |
| 3,328,502 | 6/1967 | Robeson. | |

FOREIGN PATENTS 155,379  2/1954  Australia.

DAVID SCHONBERG, *Primary Examiner.*

PAUL R. GILLIAM, *Assistant Examiner.*

U.S. Cl. X.R.

350—239, 257